Patented Oct. 9, 1934

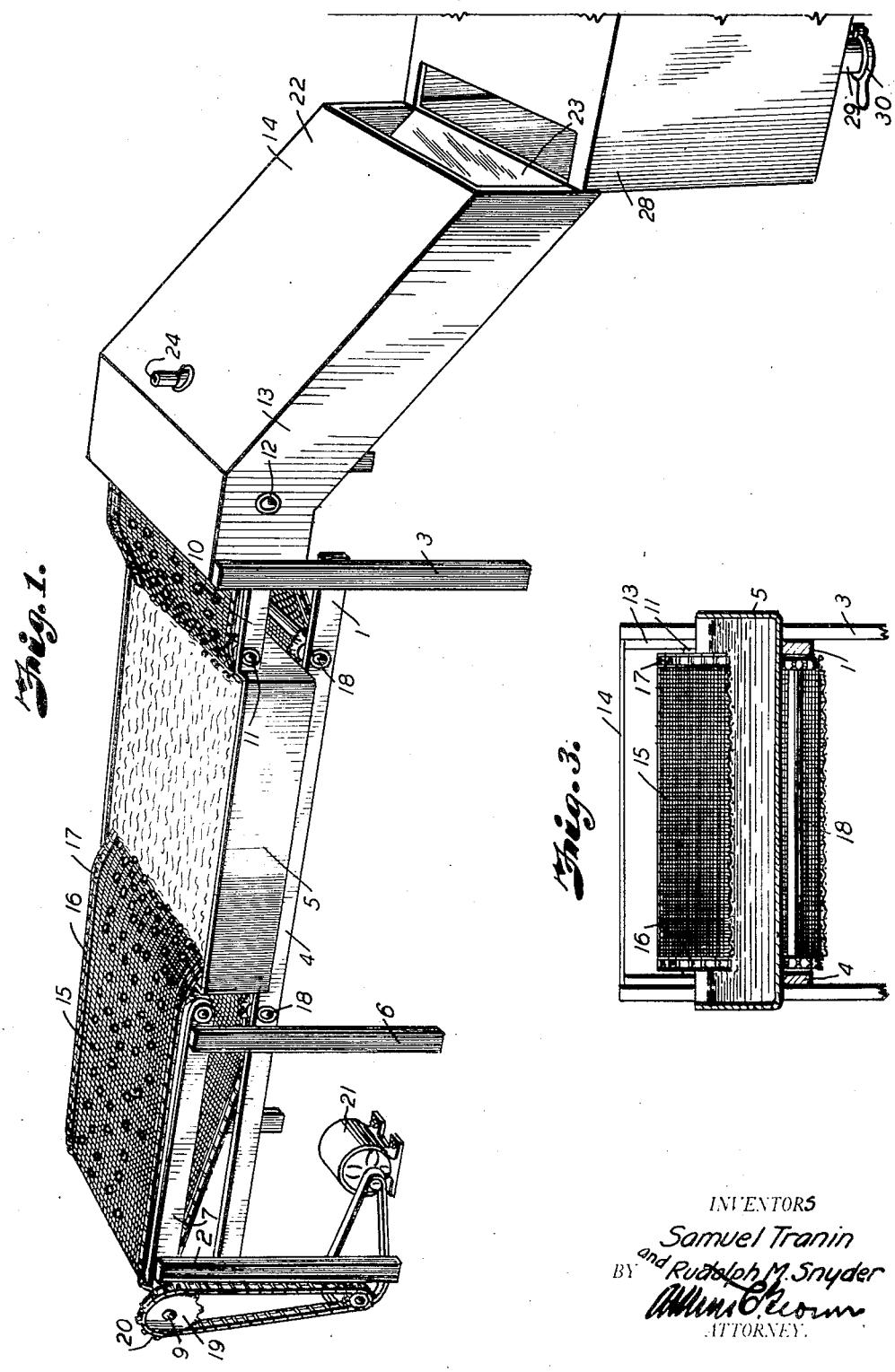

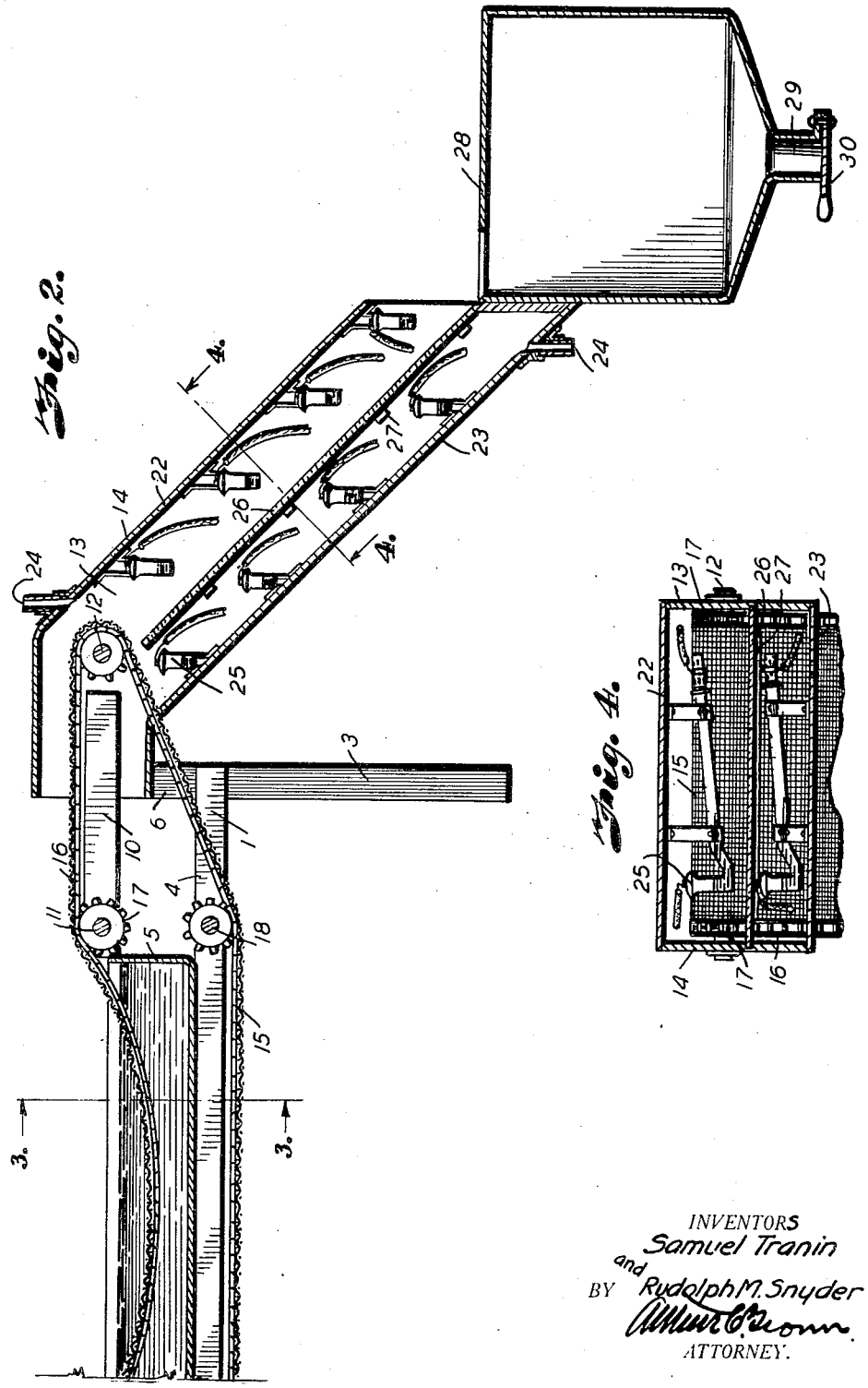

1,975,991

UNITED STATES PATENT OFFICE 1,975,991

METHOD OF TREATING SOLID FOOD PRODUCTS

Samuel Tranin and Rudolph M. Snyder, Kansas City, Mo.; said Snyder assignor to said Tranin Application August 18, 1930, Serial No. 476,024

1 Claim. (Cl. 99—1)

Our invention relates to a method of treating solid substances such as food portions normally supporting microorganisms, to reduce the activity of such organisms.

It is well known that spoilage of foods is largely due to microorganisms present either in or on the food in its natural state or becoming associated with the food accidentally. The most common method of reducing the effect of microorganisms on a food product is to heat the product sufficiently to destroy a substantial proportion of the organisms or render them innocuous, whereby the spoilage of the food may be delayed. The application of sufficient heat to effect partial or total sterilization usually results in substantially changing the quality or character of the food treated, and the heating method is therefore not applicable to many foods which are preferably supplied in their natural state, for cooking or for consumption raw.

Fluid germicidal agents have sometimes been employed for purifying solid and liquid bodies, as in the case of chlorine gas used to purify a water supply, but have not been suggested for sterilizing vegetable foods into which the agents might penetrate, so far as we are aware, because of the probability that the foods would retain sufficient traces of the germicidal agents to produce unpleasant or harmful effects.

The principal objects of our invention therefore, are to reduce the deleterious effect of bacteria on food and like products without deleteriously affecting the natural qualities of the products, to employ fluid and/or radiant germicidal agents in such a manner as to effect destruction of a substantial proportion of microorganisms associated with a vegetable food product and to separate the fluid agent from the food product.

More particularly our invention consists in applying a fluid germicidal agent to translucent solid food particles to destroy a substantial proportion of microorganisms associated with the particles, passing the particles and portions of the agent associated therewith in a relatively thin stream between lamps emitting ultra violet light rays to effect destruction of organisms not acted on by the fluid agent and stimulate the activity of vitamines, heating the particles to promote rapid evaporation of the fluid agent, and effecting removal of vapors without exposing the food particles to contamination.

Apparatus for carrying out our invention, including all the elements required for the destruction of substantially all microorganisms in a body of food particles, and eliminating the liquid treating agent, is illustrated in the accompanying drawings, wherein:

Fig. 1 is a perspective view of liquid and ray treating elements, a receiving tank being shown fragmentarily.

Fig. 2 is a fragmentary longitudinal section through the apparatus.

Fig. 3 is a section on the line 3—3, Fig. 2.

Fig. 4 is a section on the line 4—4, Fig. 2.

Referring in detail to the drawings:

1 designates a frame including end legs or posts 2 and 3 and horizontal connecting beams 4 for supporting a pan 5, and intermediate posts 6 cooperating with the posts 2 to support a supplemental conveyor frame including bars 7 fixed to the upper ends of said posts and projecting beyond the same in each direction, and rollers 8 including shafts 9 journaled in the ends of the bars.

A second conveyor frame is provided at the opposite end of the supporting frame, including short bars 10 fixed to the end posts 3 and projecting toward the pan, for supporting a shaft 11 journaled in the bars in parallel alignment with a shaft 12 journaled in the side walls 13 of a housing 14 later described.

An endless conveyor including a screen 15 formed preferably of relatively thin wires widely spaced laterally and relatively narrowly spaced longitudinally of the screen, and chains 16 on the edges of the screen, runs on said sprockets 17 fixed on the shafts 9, 11 and 12.

Shafts such as 18 mounted on the frame members 4 carry sprockets similar to the sprockets 17 to guide the lower run of the conveyor.

The upper shafts may act as rollers to support the middle portions of the screen and prevent undue sagging of the screen under the weight of the fruit carried thereby, as presently described.

The shaft 9 at the receiving end of the frame is provided with a second sprocket 19 for a chain 20 operated by a motor 21 to drive the conveyor.

The screen is thus adapted to support solid particles, for example whole fruits or portions of fruit, and carry the portions through the pan for immersion in a body of liquid contained therein, and to effect drainage of a substantial portion of liquid from the fruit as the screen passes over the space between the conveyor rollers at the opposite end of the frame.

The housing 14 above referred to further includes top and bottom walls 22 and 23 preferably formed of material opaque to ultra-violet light rays, and provided with nozzles 24 to receive tubes for circulating a cooling medium through the housing, and comprising supports for lamps 25 adapted to discharge ultra-violet light rays toward food particles passing into the housing from the delivery end of the conveyor.

An inclined plate 26 comprising a chute formed of quartz or like material adapted to permit passage of ultra-violet light rays is preferably located in receiving relation with the delivery end of the conveyor, and the housing is adjusted to the location and inclination of the plate, so that the food particles may fall from the conveyor to the plate, and slide thereover, and the lamps may be located relatively close to the sheet-like stream of food particles. The plate 26 is supported by suitable means such as strips 27 spacing the plate from the bottom wall 23.

The food particles pass from the lower edge of the plate 26 to a receiving container, and are preferably delivered through a narrow opening 27 of a receiving tank 28, having a spout-like outlet 29 provided with a valve 30, whereby the treated food may be packaged without hazard of contamination thereof by impure air.

We employ as the liquid treating agent in the pan, a germicidal liquid, preferably a saturated water solution of a halogen such as chlorine, to destroy microorganisms carried by the food particles and accessible to the agent. The fluid halogen in gaseous form or in solution, will penetrate any interstices or wounds in the food particles, and thus rid available surfaces of bacterial life.

The particles moistened by the solution will slide freely over the inclined quartz plate, and the ultra-violet rays from the lamps will penetrate the particles more or less in proportion to their translucence, and destroy surface bacteria and bacteria protected from the fluid agent by membranes or cell walls.

The heat due to operation of the lamps to produce the bacteria-destroying rays will raise the temperature in the housing, and may be controlled to provide a desired temperature therein adapted to promote vaporization of liquid adhering to the food particles without overheating the particles.

Vapors may move from the housing through the open ends thereof, and will tend to escape from the stream of food while the same is moving from the plate to the tank. The open inlet and outlet ends of the housing will afford substantial ventilation, and conduits may be connected to the nozzles 24 to provide for circulation of cooled air through the housing, to maintain a temperature therein below that normally due to operation of the lamps, and preferably below 100° F., whereby change in the natural character of the food treated may be avoided. Substantially all of the halogen carried into the tank will escape from the body of food through the openings of the housing and tank, and prevent entrance of air to the tank. Food delivered to the tank will displace a relatively heavy treating gas outwardly through the opening thereof.

The food may be delivered under conditions to prevent contamination to cans or like shipping containers as in ordinary practice, and use may be made of chlorine or like gas, for example chlorine passing with the food through the tank toward the cans and escaping from the stream of food as the latter enters and fills the cans, to maintain a sterile atmosphere in the packaging space.

The outer surface of solid food particles treated with the germicidal fluid agent, and portions of the interior adjacent the surface reached by the ultra-violet rays, will be substantially pure and free of live bacteria, and the food when packaged and sealed against contamination will therefore keep a relatively long period without refrigeration.

Small proportions of the halogen that may be retained with the food in a package when the same is sealed, will not deleteriously affect the food, and will escape quickly when the container is opened, leaving no traces to cause unpleasant tastes or odors.

What we claim and desire to secure by Letters Patent is:

In a method of treating solid particles including discharging ultraviolet rays from a heat-evolving source to treat particles with the rays, the step of treating the solid particles with a fluid germicide, passing the treated particles across the paths of said rays toward a container and sufficiently close to the source of rays to subject the particles to heat evolved from said source for promoting evaporation of adhering fluid germicide from the particles, circulating air over the particles for controlling the effect of evolved heat to avoid overheating the particles, and delivering the particles to a container.

SAMUEL TRANIN.
RUDOLPH M. SNYDER.